United States Patent
Bulusu et al.

(10) Patent No.: US 10,846,517 B1
(45) Date of Patent: Nov. 24, 2020

(54) CONTENT MODIFICATION VIA EMOTION DETECTION

(71) Applicant: Amazon Technologies, Inc., Seattle, WA (US)

(72) Inventors: Prakash Bulusu, Bangalore (IN); Pragyana K. Mishra, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 100 days.

(21) Appl. No.: 15/395,742

(22) Filed: Dec. 30, 2016

(51) Int. Cl.
*G06K 9/00* (2006.01)
*G06T 13/80* (2011.01)

(52) U.S. Cl.
CPC ..... *G06K 9/00302* (2013.01); *G06K 9/00228* (2013.01); *G06T 13/80* (2013.01)

(58) Field of Classification Search
None
See application file for complete search history.

(56) References Cited

U.S. PATENT DOCUMENTS

| | | | | |
|---|---|---|---|---|
| 2009/0285456 A1* | 11/2009 | Moon | ................. | G06K 9/00335 382/118 |
| 2010/0086215 A1* | 4/2010 | Bartlett | .............. | G06K 9/00335 382/197 |
| 2011/0145040 A1* | 6/2011 | Zahn | ...................... | G06Q 30/02 705/7.33 |
| 2013/0101225 A1* | 4/2013 | Kadoya | .............. | G06K 9/00597 382/199 |
| 2015/0331951 A1* | 11/2015 | Wang | .................... | H04L 67/306 707/734 |
| 2016/0109941 A1 | 4/2016 | Govindarajeswaran et al. | | |
| 2016/0379047 A1* | 12/2016 | Natan | ................ | G06K 9/00281 382/201 |

OTHER PUBLICATIONS

Martin Wollmer et al, LSTM-Modeling of continuous emotions in an audiovisual affect recognition framework, Image and Vision Computing, 2013 (Year: 2013).*
Haar Wavelet—Wikipedia, available as of 2015 (Year: 1015).*
U.S. Appl. No. 15/395,463, filed Dec. 30, 2016, Titled: Consumer Engagement Using Emotion Detection.

* cited by examiner

*Primary Examiner* — Mark Roz
(74) *Attorney, Agent, or Firm* — Kilpatrick Townsend & Stockton LLP

(57) ABSTRACT

Techniques for identifying an emotional response and/or emotional state for a user in response to the user interacting with content may be described herein. For example, a series of facial images of a user may be captured by a user device and transmitted to a service computer that analyzes the images to identify changes in facial animation parameters. An emotional state and/or response may be determined by the service computer by utilizing the change in the facial animation parameters and a facial action coding system. In embodiments, the service computer may edit subsequent content prior to transmitting the content to the user device, utilize a particular communication channel to communicate the content, or identify a workflow that indicates a series of actions and/or content to be presented to the user device based on the determined emotional state/response of the user.

18 Claims, 10 Drawing Sheets

CONTENT MODIFICATION VIA EMOTION DETECTION

BACKGROUND

Network-enabled devices allow people to utilize online services to shop, stream music, watch movies, or play video games without leaving the comfort of their homes or wherever they are. Online marketplaces may seek to provide recommendations or advertisements that are relevant and targeted to specific user groups based on their shopping history or browsing history. However, typical recommendation methods fail to reach the correct target segment by either including items or services that are unwanted, utilizing a communication method that is not preferred, or attempting to provide a recommendation too often or not often enough. By failing to adequately generate a valid and useful recommendation, online marketplaces alienate their user base and cause a loss of good faith and good will in the marketplaces ability to carry or offer valid services and items.

BRIEF DESCRIPTION OF THE DRAWINGS

Various embodiments in accordance with the present disclosure will be described with reference to the drawings, in which.

DETAILED DESCRIPTION

Figure 1:
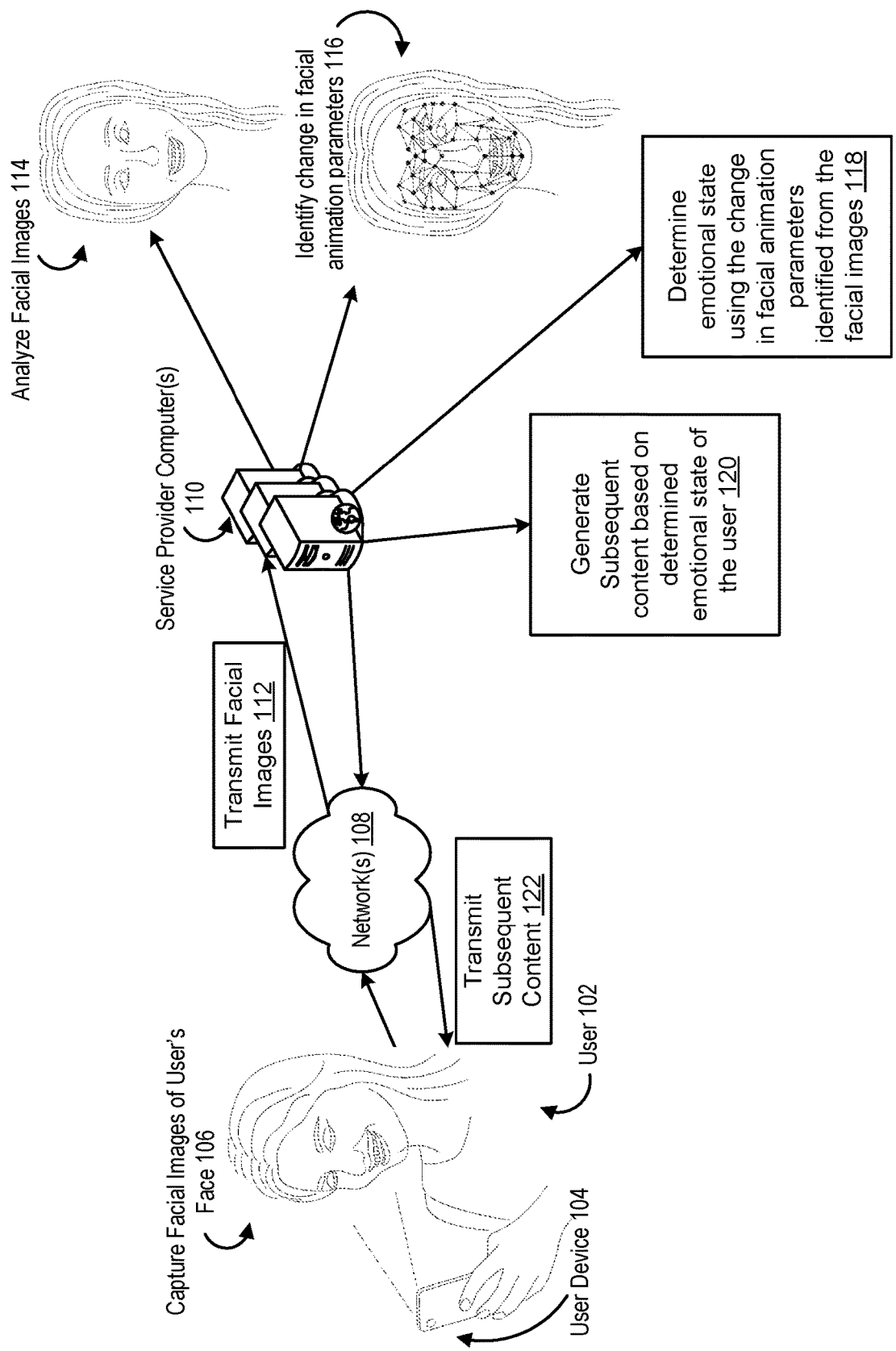
FIG. 1 illustrates an example workflow for an emotion detection and recommendation service feature, in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described herein provide an emotion detection and recommendation feature for utilizing images of a user captured using a front facing camera of a user device to determine an emotional response or state of a user as they interact with content. In particular, one or more service provider computers (or a service provider computer(s)) that is configured to implement the features described herein may generate an emotional profile for a user, determine a snapshot or dynamically determined emotional state of the user, and utilize the emotional profile and/or emotional state to generate unique recommendations, advertisements, or content to present to the user that are relevant given their emotional state. A user may opt-in to the emotion detection and recommendation feature service thereby allowing images to be captured utilizing a camera or other suitable image capture device of an associated user device to capture a series of images of the user's face to identify an emotional response and/or state. In embodiments, the service provider computers may only temporarily store and utilize the captured images when determining a user's emotional response and/or state. For example, upon determining that a user is responding happily to interacting with certain content, instructions may be generated and carried out for deleting or destroying the recently captured images. In some embodiments, the captured images of the user are dynamically utilized to determine the emotional state and/or response of the user in real-time and are never stored.

In accordance with at least one embodiment, instructions may be provided by the service provider computer to a user device of a user (i.e., a laptop, tablet computer, mobile phone, gaming device, desktop computer, etc.) to activate a front facing camera and capture a series of images at different frame rates and/or resolutions upon receiving an indication that a user is interacting with content. For example, instructions may be provided to quickly capture a series of images of the user's face upon clicking on an advertisement at 15 to 30 frames-per-second. The images may be transmitted, via available networks, to a service provider computer to analyze and determine an emotional state and/or response of the user. In embodiments, several series of images may be captured, transmitted, and analyzed by the service provider computers as the user conducts a session with a particular web page or application. For example, images may be captured and transmitted throughout a shopping and/or browsing session of the user interacting with a web page provided by an electronic marketplace or viewing streaming media via a streaming media application. As the user interacts with different content (scrolls to different portions of a web page, clicks on links, purchases items, joins services, selects particular media such as a movie or music, etc.) the user device and image capture device of an associated user device will capture images and transmit the images to the service provider computer.

In embodiments, the one or more service provider computers may identify micro expressions and macro expressions expressed by a user as they interact with content presented via the user device. A micro expression may include a facial expression that is brief and may last for a fraction of a second and can occur deliberately or unconsciously by the person expressing such an expression. A micro expression may be an expression of an emotion that a user is attempting to conceal or suppress. A macro expression may include any other suitable expression that can expressed by a user that can last from half a second to four seconds and is not typically associated with expressions that a user is attempting to conceal or suppress. In accordance with at least one embodiment, the service provider computers may identify the micro and macro expressions that are expressed by a user by utilizing changes in facial animation parameters from a default state that correspond to particular action units (AUs). The action units can be compared to a facial action coding system (FACS) to determine an emotional state and/or response expressed by a user as they interact with content. In embodiments, the facial animation parameters may correspond to a plurality of different portions of a user's face and changes in muscle movement (relaxation or flexing) at these particular portions of a user's face that can correspond to AUs. For example, when expressing surprise, a user's eyebrows may rise to a certain degree which results in surrounding muscles flexing and moving. The one or more service provider computers can analyze the series of images to identify these minute muscle flexes, relaxation, or movement and determinate a change in the facial animation parameter that can be mapped to an AU and corresponding emotion as mapped by the FACS. The service provider computers may determine an expression that is expressed by a user by mapping one or more (or any combination thereof) of AUs that are associated with an expression as identified in the FACS. For example, the FACS may identify that a user is expressing happiness when AUs 6 and 12 show movement.

In accordance with at least one embodiment, a composite default state, image, or face model of a user's face may be generated by the service provider computers utilizing the series of images captured by the image capture device of an associated user device of a user. In embodiments, the service provider computers may utilize generated and generic representation of a user's head to serve as a default state or image of a user's face. Both, either, or any combination thereof of the composite default image or the generic representation of the head can be utilized to determine movement and/or change in the facial animation parameters and corresponding AUs for various portions of a user's face by identifying the movement from the default or neutral state to the state as captured by the series of images of the user's face. In accordance with at least one embodiment, the service provider computers may also identify larger and more easily identifiable movement's associated with a user expressing emotions such as moving one's head towards or away from the user device, the yaw of the head, pitch of the head, or roll of the head when a user interacts with content presented by the user device.

In embodiments, the service provider computer may utilize the larger and more easily identifiable movement of the user's head to determine a user's emotional response and/or state when interacting with content. For example, a tilt or sway of the head away from the screen upon clicking on a recommendation may be identified as disinterest or disgust with the recommendation. In embodiments, the service provider computers and/or user devices may utilize one or more suitable feature based methods for face detection and tracking such as low-level edge detection, color histogram detection algorithms, Hessian of Gaussian detection algorithms, motion or optical flow detection algorithms, first-order and second-order derivatives of grayscale or color intensity detection algorithms, Harr wavelet detection algorithms, scale-invariant feature transform detection algorithms, feature constellation analysis, active-shape or active-appearance models, or point distribution models. The service provider computers and/or user devices may utilize one or more image-based methods for face detection and tracking such as linear-subspace image detection and tracking, neural network image detection algorithms, convolution neural net image detection algorithms, or statistical and/or probabilistic face model detection algorithms. In accordance with at least one embodiment, the service provider computers may identify critical points and/or positions of a user's face in response to the face detection and tracking such as the eyes, eyebrows, nose, cheekbones, chin, and lips of the user's face in the series of images captured by the user device.

In accordance with at least one embodiment, the service provider computers can utilize the determined emotional state and/or response of the user to recommend further content. For example, an emotional profile for the user can be generated, updated, and maintained by the service provider computers for each user of the service. The emotional profile of the user may track and identify emotional responses and/or states of the user and the content that elicited such responses. The emotional profile may identify trends in emotions expressed by the user given a particular season or time period in the year. Further gradations of emotions to time periods may be identified, for example a user may feel grumpy early in the morning but their mood may characteristically improve towards the end of a nine-to-five work day. In accordance with at least one embodiment, the service provider computers may aggregate or cluster similar emotional profiles into one or more groups. For example, a user's emotional profile may be grouped with another group of user's emotional profiles that responded similarly to the same presented content (advertisement or recommended item). These clustered emotional profile groups can be used by the service provider computers to generate accurate and relevant recommendations for content. For example, an emotional profile may track and maintain actions taken by a user after expressing a certain emotion (a given user that is angry usually ends the session soon after) or, content interacted with upon expressing a certain emotion (users are more likely to sign up or renew a service upon expressing happiness or joy at a recommendation). The service provider computer can generate content, recommendations for content and/or services, or take other actions utilizing the emotional reactions and historical interactions and activities of other users with similar emotional profiles that are relevant and accurate.

In accordance with at least one embodiment, the emotional profile may also track and maintain preferred communication channels that are utilized when a user is in a certain emotional state or, what emotions are historically expressed by a user when utilizing a particular communication channel (e.g., a user usually expresses annoyance when utilizing their mobile phone but tends to express happiness when utilizing a desktop computer). The aggregated and or clustered groups of emotional profiles can also be an important data point when determining which communication channel to utilize when transmitting content, recommendations, advertisements, etc., upon determining a user's emotional state and/or response. In embodiments, a communication channel may include a suitable marketing or advertising channel, social media channels, email channels, short message service (SMS) text channel, video logs, blogs, streaming media channel, or other suitable marketing or advertising channels. In accordance with at least one embodiment, the emotion detection and recommendation service may edit and/or select content based on determining a user's emotional state and/or response. For example, a user who expresses happiness upon selecting a particular song in a music streaming service may have their playlist updated with other joyful or upbeat songs that are also enjoyed by people with similar emotional profiles when expressing happiness. As another example, the service provider computer may avoid presenting colorful and loud advertisements to a user who expresses sadness upon selecting a slow song in a music streaming service to avoid driving the user to annoyance or anger at the emotion detection and recommendation service.

Certain content can be avoided or pre-generated or dynamically generated content can be edited based on detecting a user's emotional response and/or state prior to transmitting the content to the associated user device. In accordance with at least one embodiment, the emotion detection and recommendation service may select or determine a workflow of content or activities for the user to interact with based on their detected emotional response and/or state. In some embodiments, the workflow of content or activities may indicate the order of content or actions to present as well as the duration of each piece of content or activity within the workflow of content that can be based on the emotional state/response of a user or an emotional profile of a user. The workflow of content or activities may be updated based on the aggregate response from a plurality of users (e.g., based on input or lack of input provided by users when exposed to the content or activity included in a workflow). For example, a first workflow of content to present to a user that is determined to be expressing joy can include a renewal option for a service offered by an electronic marketplace followed quickly by a one button purchase option for any items selected by a user during a session. In accordance with at least one embodiment, the emotion detection and recommendation feature service may identify an aggregated emotional response and or effect of an advertisement or marketing campaign by tracking and maintaining the emotional response and/or state of a user upon interacting with the advertisement or other content associated with a marketing campaign. In embodiments, the emotional effect or response of a campaign can be utilized to alter or update the campaign or generate other actions that should follow or be associated with the campaign such as a sign up for new services or an ending other services by a competitor. In some embodiments, a number or set of aggregated emotional responses and or states may be identified for an advertisement or marketing campaign. For example, a subset or portion of the set of aggregated emotional responses may be associated for the advertisement or marketing campaign. In embodiments, the service provider computers may determine a score that represents a likelihood that a user will express a particular emotional response based on the aggregated emotional responses.

FIG. 1 illustrates an example workflow for an emotion detection and recommendation service feature, in accordance with at least one embodiment. The workflow 100 of FIG. 1 includes a user 102 interacting with content presented by user device 104. As described herein, the user device 104 may capture facial images of the user's face 106 upon receiving an indication of the interaction by the user 102 with the content presented by user device 104. In some embodiments, the indication of interaction may be transmitted, via networks 108, to the service provider computers 110, which may in turn transmit instructions to the user device 104 for capturing a series of images (106) of the user as they interact with the content. The user 102 may have previously opted-in to allow an image capture device or front facing camera of the user device 104 to capture facial images of the user 102 upon receiving or obtaining the indication that the user 102 is interacting with content (i.e., being presented with an advertisement or selecting streaming media). The workflow 100 depicts the user device 104 transmitting the facial images 112, via networks 108, to the service provider computers 110 for identification of facial features, changes in facial animation parameters, determination of action units, and mapping of the action units to expressed emotions by user 102. Although FIG. 1 illustrates the service provider computers 110 identifying and analyzing facial images 112 for determining user 102's emotional response and/or state, in some embodiments the user device 104 may be configured to perform similar operations and utilize similar modules as the service provider computers 110 for performing the same features. In accordance with at least one embodiment, the user device 104 may be configured to extract or analyze facial images 114 and determine the facial animation parameters, action units, changes in the facial animation parameters of the user's 102 face, or other suitable information to determining the user's 102 emotional state, and transmit information about the facial animation parameters or change in the facial animation parameters, action units to the service provider computers 110. In some embodiments, the user device 104 may perform the same functionality and be configured similar to the service provider computers 110, capable of analyzing facial images 114, identifying changes in facial animation parameters 116, determining an emotional state for the user 118, and generate and presenting subsequent content based on the determined emotional state of the user 120 and 122. In embodiments where the user device 104 is configured to extract or analyze facial images 114 to determine facial animation parameters or changes in the facial animation parameters, the images of the user captured by the user device 104 are not stored either on the user device 104 or the service provider computers 110.

As depicted in workflow 100 of FIG. 1, the service provider computers 110 may analyze the facial images at 114 to identify facial features using image detection algorithms for example. The service provider computers 110 may identify facial features and focus on particular portions of the facial features such as eyes, eye brows, nose, cheeks, etc., to identify a change in facial animation parameters 116. As described herein, the service provider computers 110 may utilize the slight and obvious movements of muscles (flexing or relaxing) in the particular portions of the user's 102 face to identify a change in the facial animation parameters and map the changes in said portions to action units defined by the facial action coding system. Workflow 100 also includes the service provider computers 110 determining an emotional state of the user 102 by using the change in facial animation parameters 116 from the identified facial images 114 at 118.

In accordance with at least one embodiment, other techniques or coding systems than FACS can be utilized to determine an emotional state and/or response from a user 102 such as the motion picture experts group (MPEG) 4 file allocation synthetic/natural hybrid coding standard, the facial action scoring technique (FAST), Facial Electromyography (EMG), Maximally Discriminative Facial Movement Coding System (MAX), FACS Affect Interpretation Database (FAC SAID), Affect expression by holistic judgement (AFFEX) system, or a proprietary emotional coding system that is specified by the emotion detection and recommendation service. In response to determining an emotional state of the user at 118, the service provider computers 110 may generate subsequent content for presentation to the user at 120. For example, the service provider computers 110 may generate and transmit a coupon for 20% off of a pair of shoes that the user is happy about according to their determined emotional state at 118. The workflow 100 also depicts the service provider computers 110 transmitting the subsequent content (coupon) 122 to the user device 104. As described herein, the communication channel to transmit the subsequent and/or additional content to user device 104 may be selected based on the determined emotional state of the user at 118.

Figure 2:
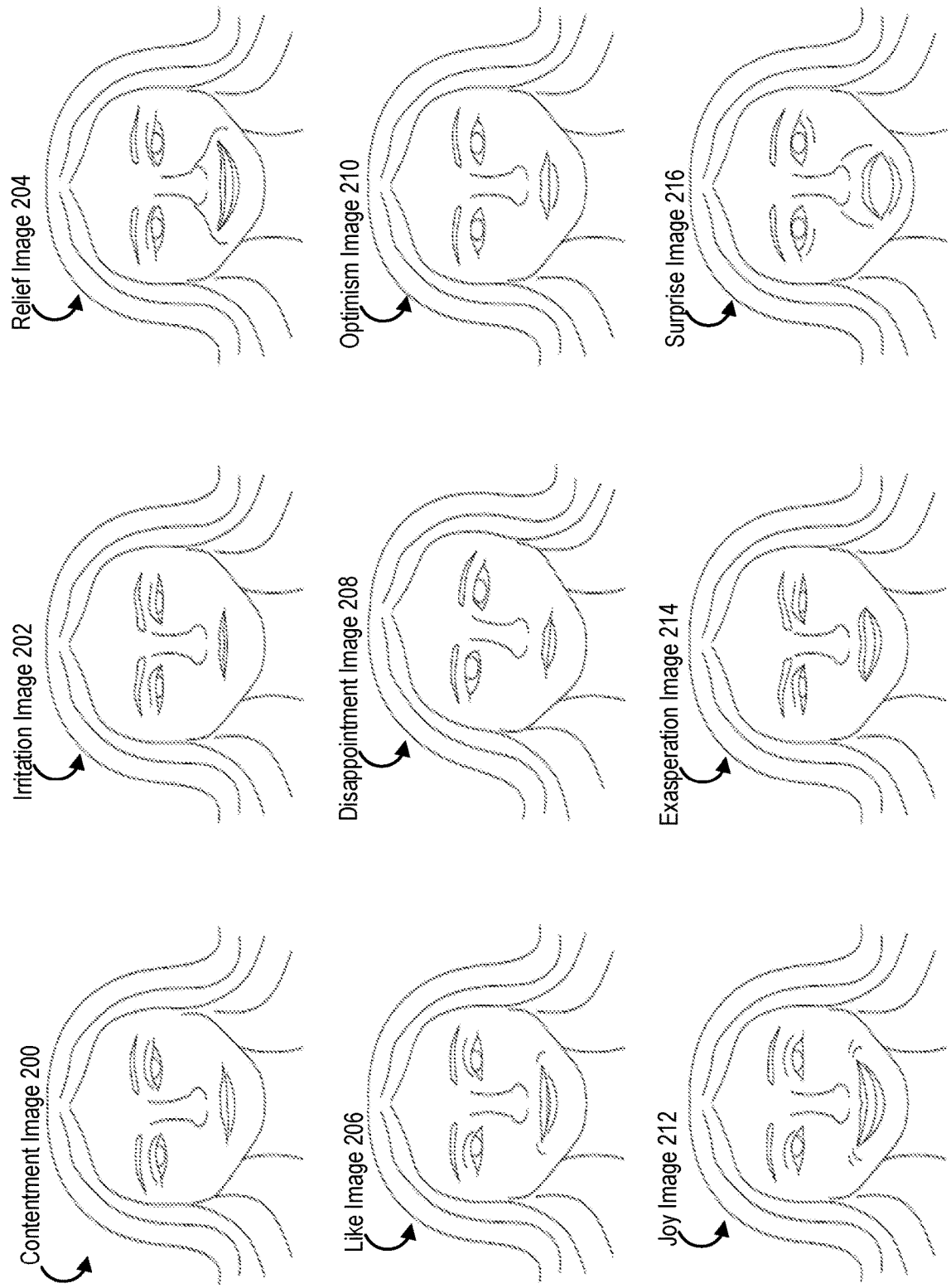
FIG. 2 illustrates example emotions that a user may express while interacting with content provided by a content provider, in accordance with at least one embodiment.

FIG. 2 illustrates example emotions that a user may express while interacting with content provided by a content provider, in accordance with at least one embodiment. In embodiments, a user may express a number of emotions such as those depicted in FIG. 2. FIG. 2 illustrates examples of extracted and analyzed images of a user expressing various emotions utilizing the techniques described herein including capturing a series of images from a front facing camera of an associated user device and identifying facial features and images to determine a change in facial parameters that can be classified as particular action units and mapped to emotions according to a coding system such as FACS. For example, FIG. 2 illustrates a contentment image 200 that is extracted from a series of images captured by a user, an irritation image 202, a relief image 204, a like image 206, a disappointment image 208, an optimism image 210, a joy image 212, an exasperation image 214, and a surprise image 216.

It should be noted that although FIG. 2 illustrates a limited number of emotions that are expressed by a potential user and detected by the service provider computers, the depicted emotions are not intended to be exhaustive or limiting. Instead, the above described facial action coding systems may identify more or less emotions and each emotion can be utilized by the service to selected and/or edit content, select a particular communication channel, determine an emotional profile for the user, aggregate the user's emotional profile, generate recommendations or subsequent content, or select or edit a particular workflow of content or activities for the user. In accordance with at least one embodiment, the emotion detection and recommendation feature service may identify a first category of emotional response and/or state of a user given a real-time analysis and may subsequently filter or determine a sub-category of emotion within the previous detected emotion. For example, a quick analysis and determination may identify that a user is expressing a happy emotional state/response but a further analysis may reveal that the user is actually expressing a joyful, ecstatic, or optimistic expression all of which may be a sub-category of a happy emotion.

Figure 3:
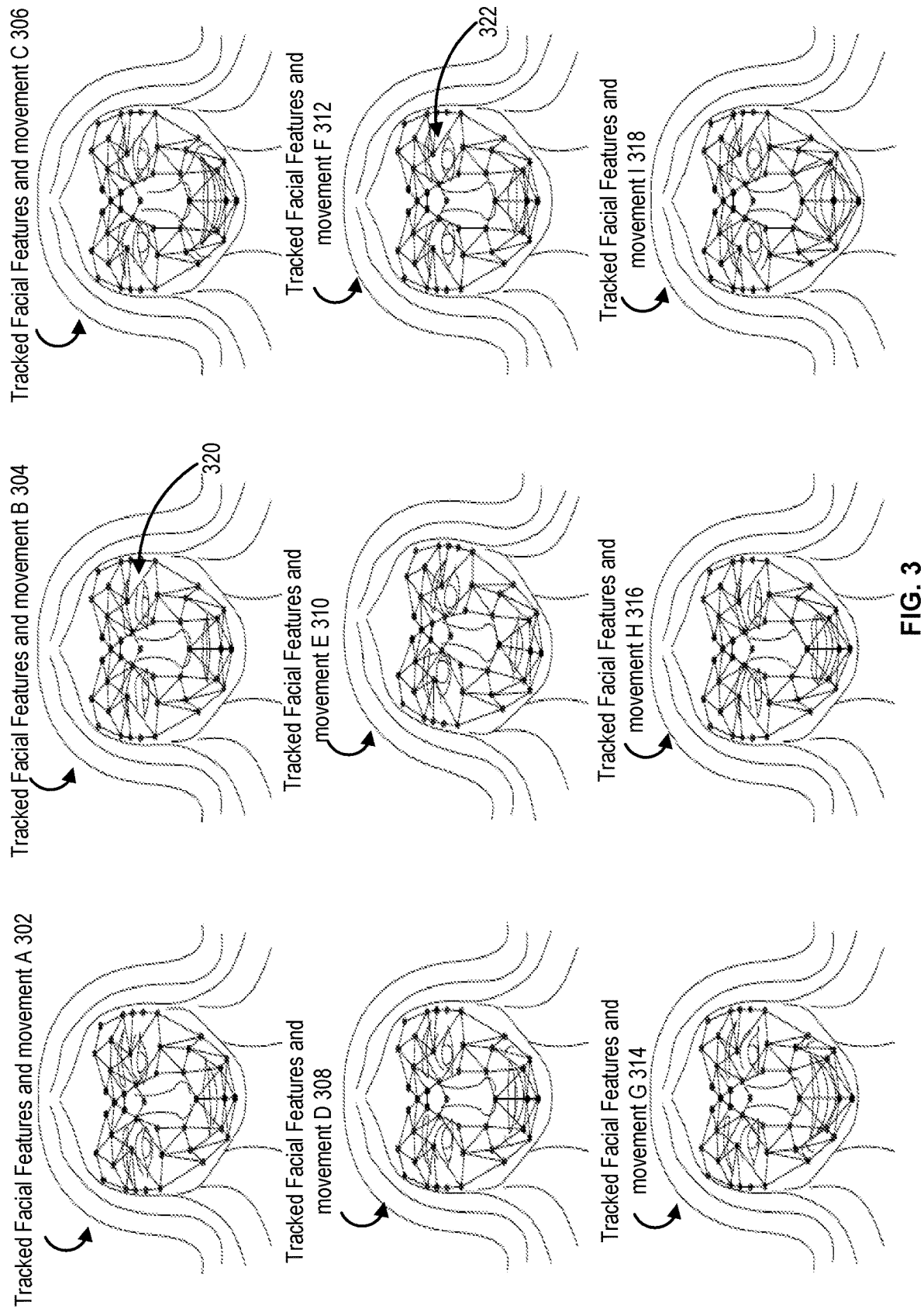
FIG. 3 illustrates examples of facial animation parameters that are tracked and detected by a user who is expressing a range of emotions, in accordance with at least one embodiment.

FIG. 3 illustrates examples of facial animation parameters that are tracked and detected by a user who is expressing a range of emotions, in accordance with at least one embodiment. FIG. 3 depicts examples of facial feature that are identified and tracked by the service provider computers utilizing the facial image detection techniques and facial animation parameter techniques described herein. For example, tracked facial features and movement A 302 illustrates the one or more portions of the user's face that are focused on and tracked to detect contentment image 200 from FIG. 2. In accordance with at least one embodiment, the service provider computers may focus or utilize different (less or more) portions of the face when detecting one type of emotion versus another. As illustrated in FIG. 3, the tracked facial features and movement for facial images 302-318 correspond to emotions 200-216 of FIG. 2. FIG. 3 illustrates the various movements changes of the facial muscles (flexing or relaxing) in various portions of the users face when one emotion is expressed (i.e., 320 eyes of 304 that corresponds to expressing irritation 202 and 322 eyes of 312 that corresponds to expressing optimism). As described herein, it is the subtle and sometimes not subtle movement and changes of various portions of a user's face that can be mapped to particular action units that are associated with a user expressing a certain emotion that can be utilized by the service provider computers to determine an emotional state and/or response of a user upon interacting with content.

Figure 4:
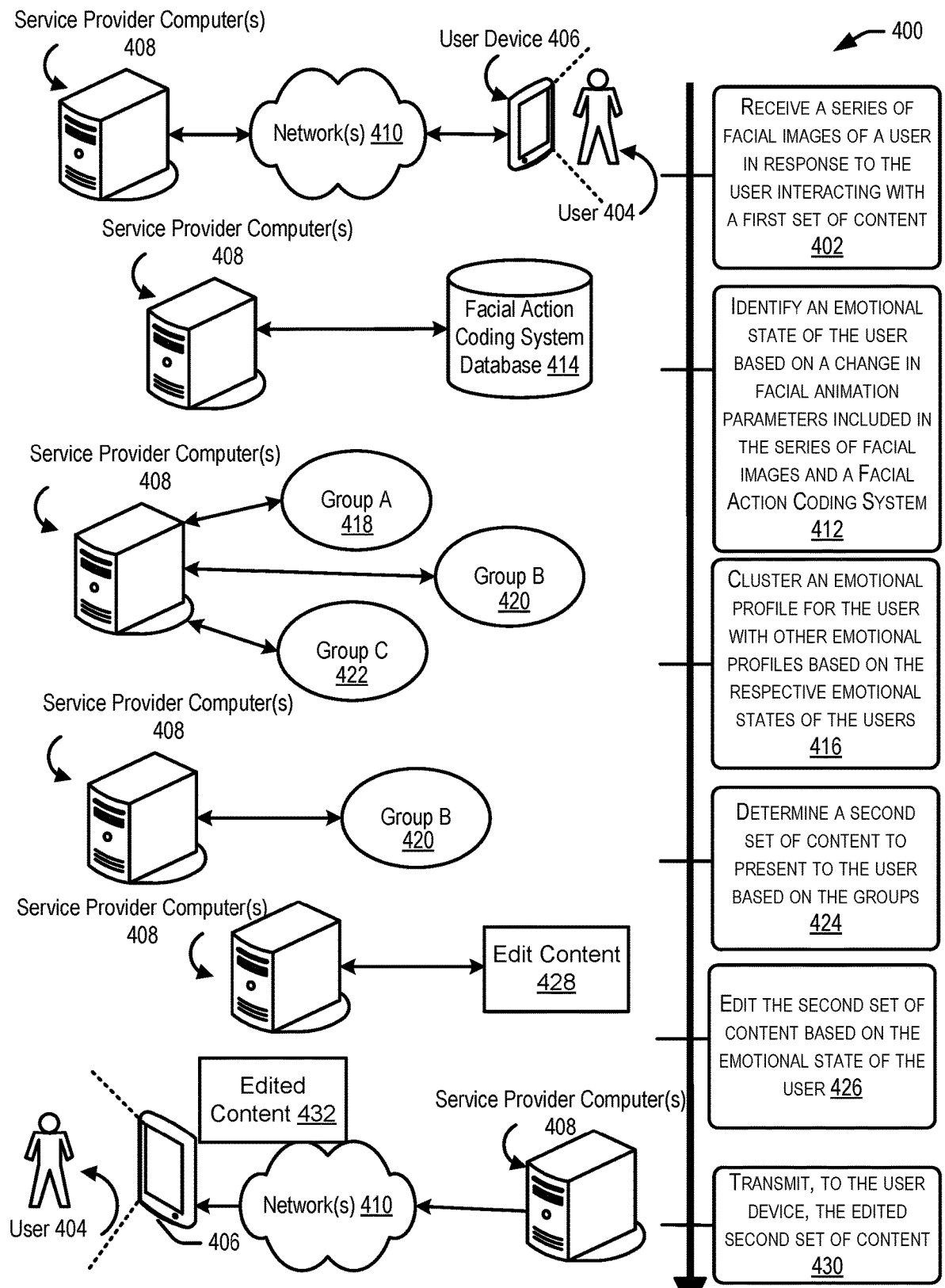
FIG. 4 illustrates an example workflow for an emotion detection and recommendation service feature that includes editing content, in accordance with at least one embodiment.

FIG. 4 illustrates an example workflow for an emotion detection and recommendation service feature that includes editing content, in accordance with at least one embodiment. The workflow 400 of FIG. 4 may include receiving a series of facial images of a user in response to the user interacting with a first set of content at 402. For example, the user 404 may select a first movie via a movie streaming service presented with the user device 406. The indication of interaction may trigger the capture and transmission of the series of facial images from the user device 406 to the service provider computers 408 via networks 410. The workflow 400 may include identifying an emotional state of the user based on a change in facial animation parameters included in the series of facial images and a facial action coding system at 412. In embodiments, the service provider computers 408 may determine action units using the change in facial animation parameters expressed by the user 404 as identified in the series of images received from the user device 406. The service provider computers 408 may map or look up the emotion(s) associated with the action units expressed by the user 404 by communicating with a facial action coding system database 414.

The workflow 400 may include clustering an emotional profile for the user 404 with other emotional profiles based on the respective emotional states of the users at 416. For example, the service provider computers 408 may identify three groups, group A 418, group B 420, and group C 422 with which to cluster the emotional profile of user 404. Each group A 418, B 420, and C 422 may include one or more other users who have similar emotional profiles (i.e., expressed similar emotions or responses when presented with the same or similar content as user 404). As described herein, the emotional profiles for each user may track and maintain the emotional response to each piece of content or interaction with a set of content as well as a communication channel utilized to interact with the content. In some embodiments, the emotional profile for the user 404 may be clustered or grouped based on an expected response to a piece of content. For example, users that have all interacted or provided social media input may be grouped together and the emotional profiles may be indicated as similar based on the input provided. In embodiments, propensity scores may be calculated for users that order or purchase items or services from an electronic marketplace. The user's emotional profile may be clustered with other user's emotional profiles based on similarity in propensity scores. The workflow 400 may include determining a second set of content to present to the user 404 based on the one or more clustered groups at 424. For example, the service provider computers 408 may select users of group B 420 to identify and select a second set of content to user 404. For example, user 404 and users from group B 420 may have all expressed shock to being presented a certain advertisement. The users from group B 420 may have each selected a subsequent action or interacted with a particular piece of content upon expressing shock. The subsequent action or content may be selected by the service provider computers 408 for presentation to the user 404 in embodiments.

The workflow 400 may include editing the second set of content based on the emotional state of the user 404 at 426. As described herein, the service provider computers 408 may select and edit content 428 based on the determined emotional response and/or state of the user 404. Editing content 428 can include editing pre-generated content, such as template advertisements, recommendations, or other suitable content, as well as selecting dynamically generated content and including or excluding certain features, colors, aspects from the content as it is generated. For example, editing the content can include removing or adding text, images, interaction features, editing the text or images themselves, changing colors, adding or removing interactive features such as links, music, videos, or other suitable editing actions that can be taken with content. The workflow 400 may conclude at 430 by transmitting, to the user device 406, the edited second set of content 432. The service provider computers 408 may transmit the edited second set of content 432 to the user device 406 for presentation to the user 404 via networks 410. In accordance with at least one embodiment, a particular communication channel may be selected and utilized for transmitting the edited second set of content 432. For example, the communication channel (email, short message service (SMS) text, native application notification, telephone call, etc.) may be selected based on the determined emotional response and/or state of the user 404.

Figure 5:
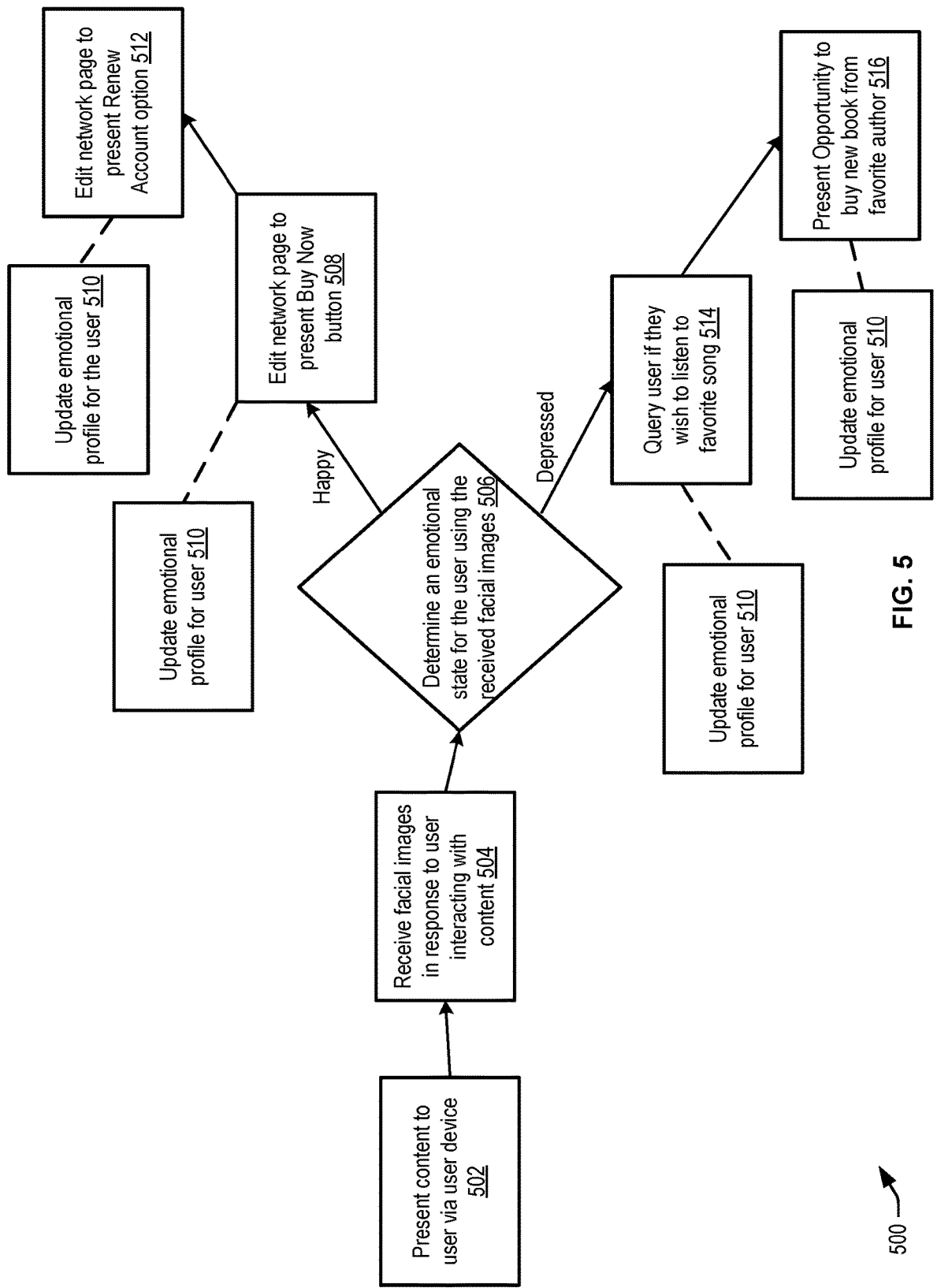
FIG. 5 illustrates an example flow chart for an emotion detection and recommendation service feature, in accordance with at least one embodiment.

FIG. 5 illustrates an example flow chart for an emotion detection and recommendation service feature, in accordance with at least one embodiment. The flow chart 500 of FIG. 5 may include presenting content to the user via an associated user device at 502. For example, an item detail page for a television offered by an electronic marketplace may be presented via a web page displayed by the user device of the user. The flow chart 500 may include receiving facial images of the user in response to the user interacting with the content at 504. For example, the user may interact with content by scrolling to a certain portion of the web page, by clicking on a link displayed by the web page, interacting with buttons presented in the web page, etc. The flow chart 500 may include determining an emotional state for the user using the received facial images at 506. In accordance with at least one embodiment, the service provider computers may utilize facial detection and tracking algorithms to identify the user's face in the received images and subsequently utilize tracked changes in facial animation parameters in particular portions of the user's face when compared to a face model or default state facial image of the user. The changes in the facial animation parameters may be mapped to one or more action units which can be utilized by the service provider computers to determine an emotion expressed by the user while interacting with the content by confirming the action unit(s) with FACS or another facial action coding system.

The flow chart 500 may include taking one or more actions based on the emotion determined at 506. For example, flow chart 500 illustrates one path if the user expresses happiness by editing the network page (web page) to present a Buy Now button at 508. In embodiments, the flow chart 500 may include updating the emotional profile for the user at 510 based on the user either interacting or omitting to interact with the Buy Now button presented at 508 via the network page. The happiness path continues in flow chart 500 by further editing the network page to present a renew account option at 512. The renew account option of 512 may be presented with or without the interaction of the user with the buy now button at 508. As described herein, the one or more service provider computers may generate and/or select a workflow of actions and/or content to present to the user based on their determined emotional state and/or response. For example, a particular workflow associated with users that express happiness may dictate that a buy now button followed by editing the network page to present a renew account option should be presented to the user. As illustrated in FIG. 5, the emotional profile for the user may be updated at 510 based on the user interacting or not interacting with the renew account option at 512.

The flow chart 500 may include a separate path to utilize if the user's emotional state or response indicates that the user is depressed. For example, the service provider computers may identify that the user is depressed using the received facial images of the user and query the user if they would like to listen to one of their favorite songs at 514. It should be noted that although FIG. 5 includes two example emotions detected and paths of actions or content to present to a user, the disclosure included herein includes identifying a plurality of emotions and workflows of actions and/or content to present to a user based on identifying the plurality of emotions that can be expressed by a user. As with the happiness path, the emotional profile for the user may be updated at 510 based on whether the user answers positively or negatively to the query to listen to their favorite song at 514. The flow chart 500 may conclude in the depression path at 516 by presenting an opportunity to buy a new book from a favorite author of the user. Again, based on the input or interaction of the user, the emotional profile for the user may be updated at 510. In embodiments, the updated emotional profile for the user may be utilized to update the clustering of groups that the user's emotional profile is associated with, to drive subsequent recommendations, communication channels utilized, and/or workflows of content and actions to select as well as editing content. In embodiments, actions or content that may be included for presentation to the user (i.e., favorite song, new book from favorite author) may be derived from the user's shopping and/or browsing history or from the shopping and/or browsing history of users that are in the same emotional profile group.

Figure 6:
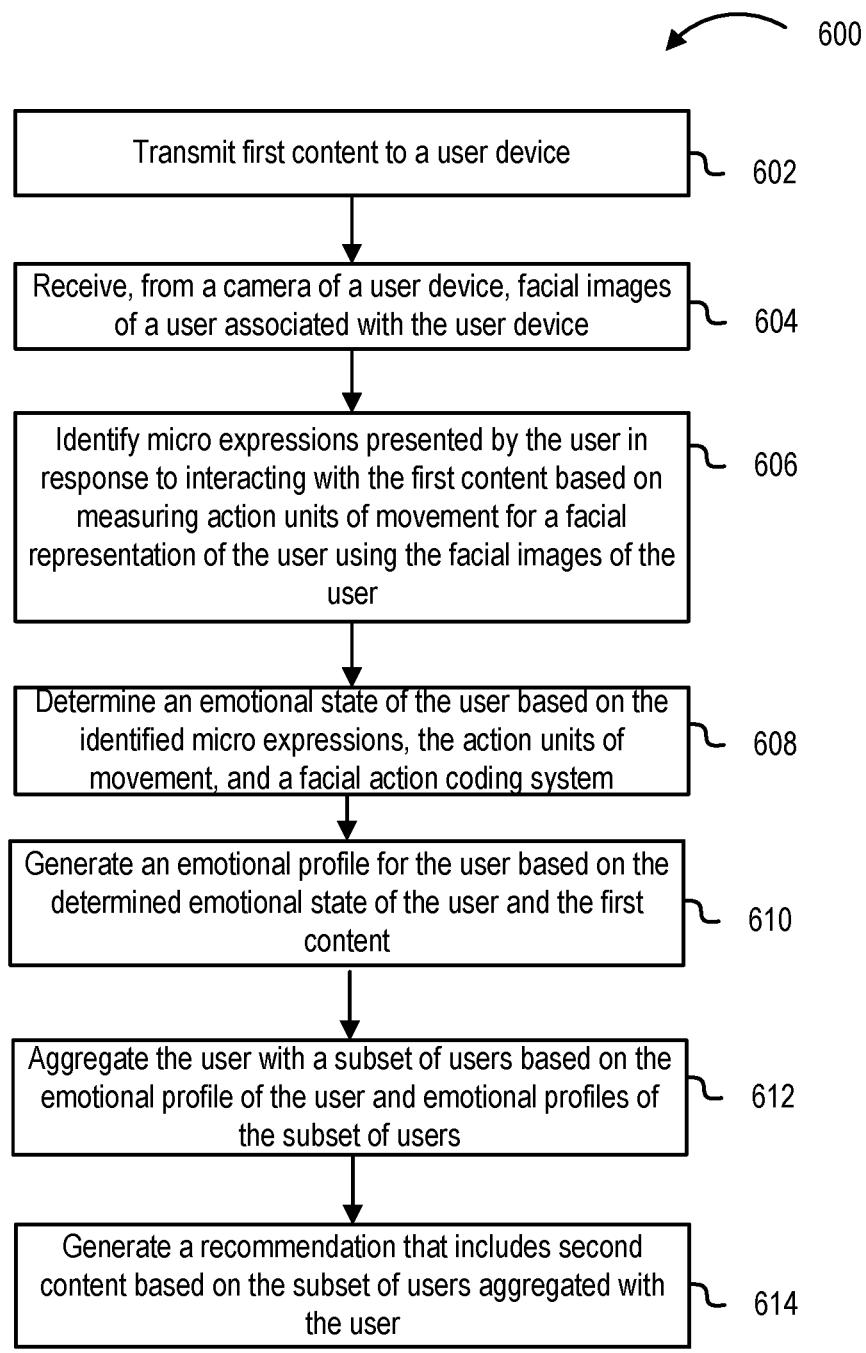
FIG. 6 illustrates an example flow chart for an emotion detection and recommendation service feature, in accordance with at least one embodiment.
Figure 7:
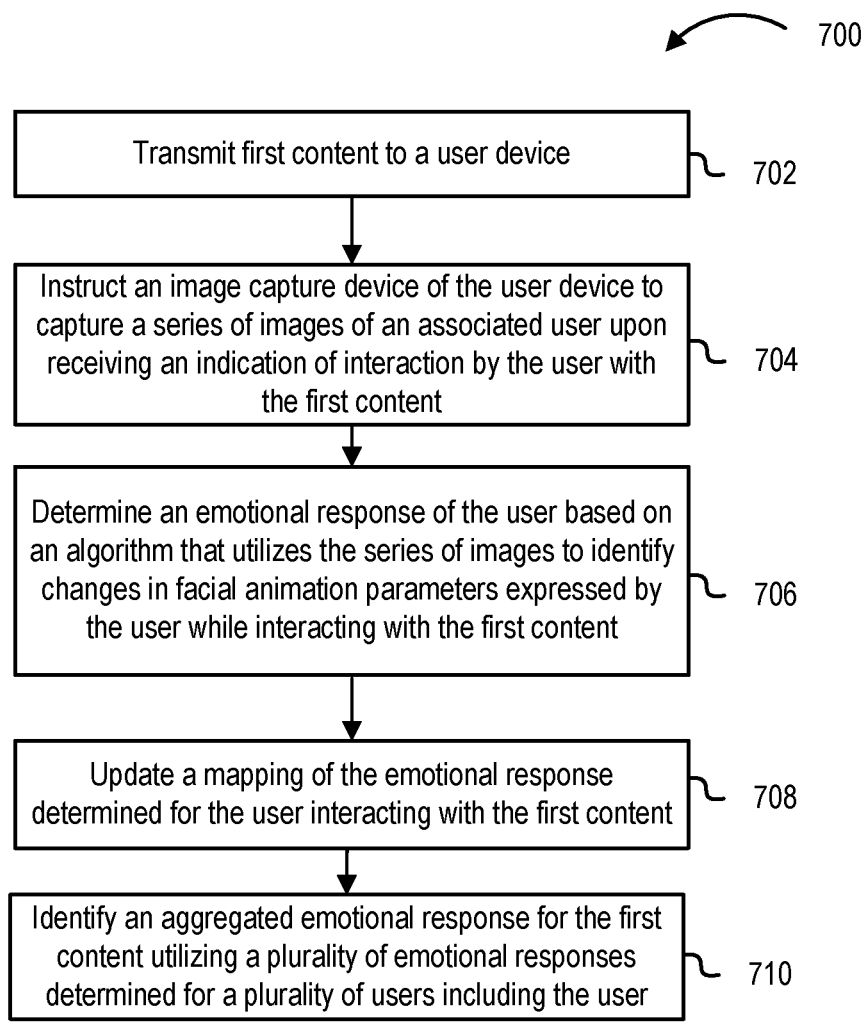
FIG. 7 illustrates an example flow chart for an emotion detection and recommendation service feature, in accordance with at least one embodiment.
Figure 8:
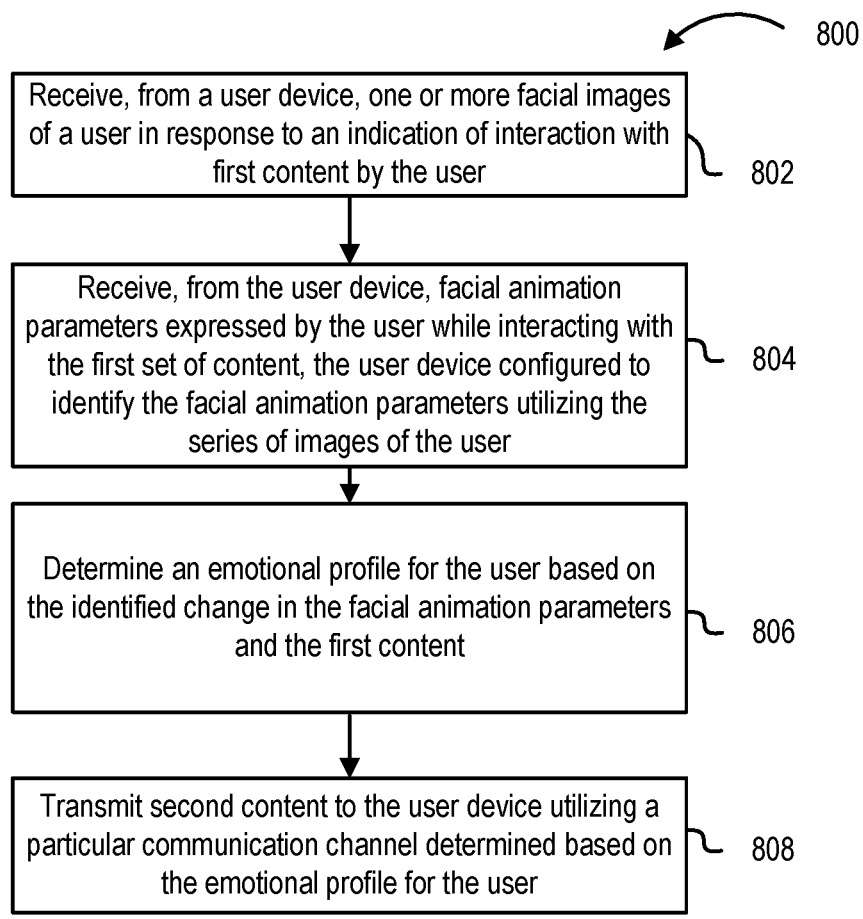
FIG. 8 illustrates an example flow chart for an emotion detection and recommendation service feature, in accordance with at least one embodiment.

FIGS. 6-8 illustrate example flows for an emotion detection and recommendation feature, according to embodiments. These processes are illustrated as a logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer executable instructions include routines, programs, objects, components, data structures and the like that perform particular functions or implement particular data types. The order in which the operations are described is not intended to be construed as a limitation, and any number of the described operations can be combined in any order and or in parallel to implement the process.

Additionally, some, any, or all of the process (or any other processes described herein, or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. As noted above, the code may be stored on a computer-readable storage medium, for example, in the form of a computer program including a plurality of instructions executable by one or more processors. The computer-readable storage medium may be non-transitory.

Figure 9:
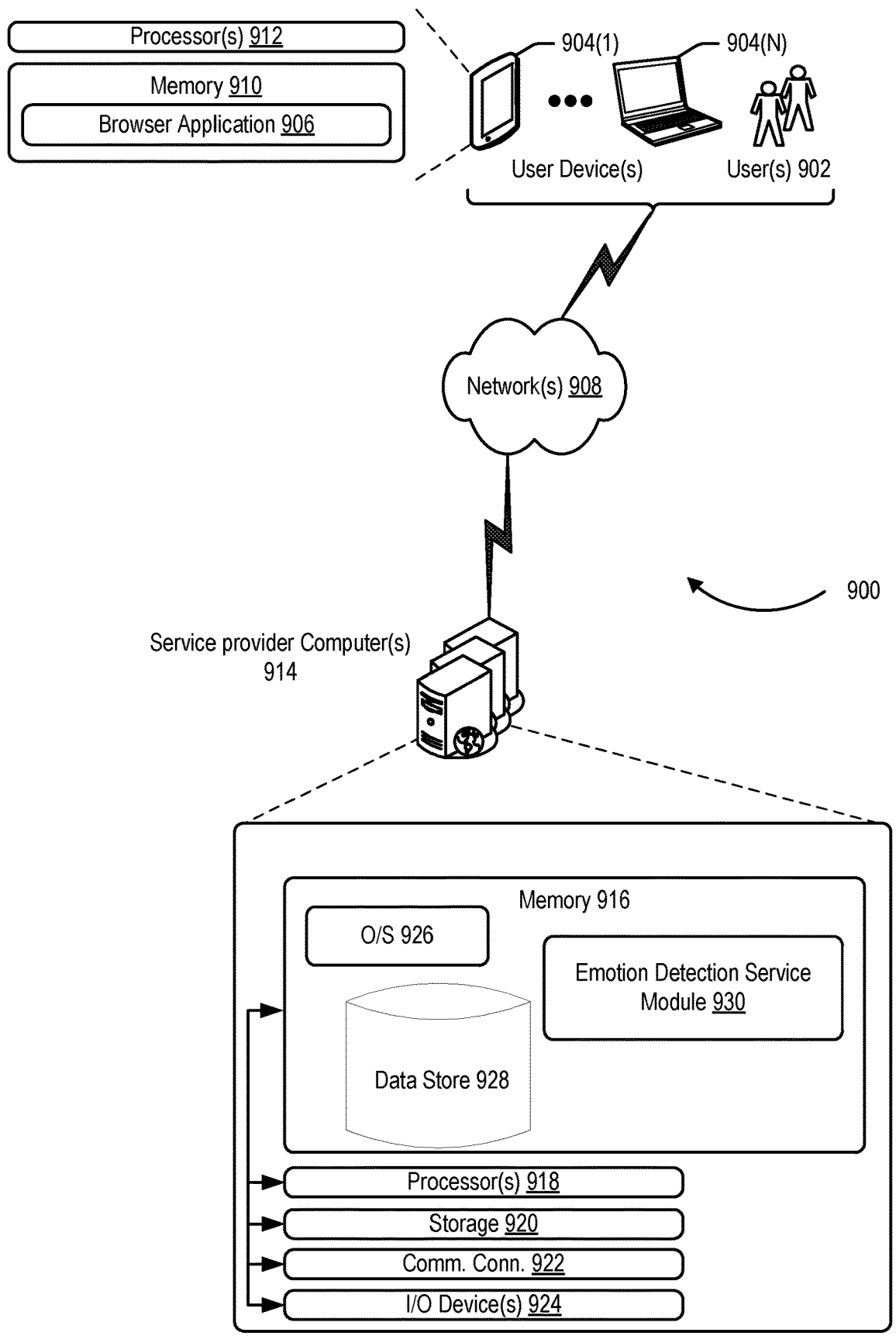
FIG. 9 illustrates an example architecture for implementing an emotion detection and recommendation service feature, in accordance with at least one embodiment.

In some examples, the one or more service provider computers (one or more service provider computers 110, 408, and 914) utilizing at least the emotion detection service module 930 shown in FIGS. 1, 4, and 9 may perform the processes 600, 700, and 800 of FIGS. 6-8. In FIG. 6 the process 600 may include transmitting first content to a user device at 602. For example, a service provider, online marketplace, or electronic marketplace, may generate and transmit a coupon that can be redeemed to receive free shipping on a particular item category. In some examples, the content can include streaming media such as music, TV shows, movies, etc. The process 600 may include receiving, from a camera of a user device, facial mages of a user associated with the user device at 604. In some embodiment, an image capture device of the user device may capture a video, video stream, or obtain a series of images for transmittal to the service provider computer.

The process 600 may include identifying micro expressions presented by the user in response to interacting with the first content based on measuring action units of movement for a facial representation of the user using the facial images of the user at 606. In embodiments the action units may represent movement in certain parts or portions of the user's face which are associated with expressing certain emotions according to a facial action coding system. The process 600 may include determining an emotional state of the user based on the identified micro expressions, the action units of movement, and a facial action coding system at 608. As described herein, other suitable systems may be utilized for determining an emotion expressed by a user based on micro movements of facial muscles included in a series of images of a user, such as a facial action scoring technique. The process 600 may include generating an emotional profile for the user based on the determined emotional state of the user and the first content at 610.

In embodiments, the service provider computer may map a series of determined emotional states of the user as determined by received images to determine an emotional state of the user. The emotional state of the user may be updated based on new data. As described herein, the service provider computers may delete the facial images of the user upon determining the emotional state of the user. In some embodiments, determining the emotional state of the user may include utilizing a synthetic natural hybrid coding standard, facial action scoring technique, facial electromyography, or maximally discriminative facial movement coding system. Each of these techniques or systems may be utilized to identify and map changes or movement of portions of a user's face to a range of emotions expressed by humans. In accordance with at least one embodiment, identifying the micro expressions presented by a user in response to interacting with content may be based on identifying a change in a particular action unit from a default mapping of a facial image for the user. The service provider computer may transmit instructions to the user device to focus the camera of the user device on certain portions of the user, or the user's face, when capturing the facial images.

The process 600 may include aggregating the user with a subset of users based on the emotional profile of the user and emotional profiles of the subset of users at 612. In some embodiments, recommendations may be generated using information, such as emotional responses, as identified in their emotional profiles for users that are similar to the user thereby generating recommendations that are appropriate given a current emotional state of the user. The process 600 may conclude at 614 by generating a recommendation that includes second content based on the subset of users aggregated with the user. In accordance with at least one embodiment, the emotional profile of the user can be associated with one or more other groups of users and may be associated or disassociated from said groups based on updated data received from the user's determined emotional responses to interacting with presented content.

The process 700 may include transmitting content to a user device at 702. The process 700 may include instructing an image capture device of the user device to capture a series of images of an associated user upon receiving an indication of interaction by the user with the first content at 704. As described herein, the image capture device of the user device may be configured to capture a video stream or recording of the user's reaction to interacting with content. Further, the user must opt-in to the emotion detection and recommendation service and allow the service to utilize images captured by the image capture device. The process 700 may include determining an emotional response of the user based on an algorithm that utilizes the series of images to identify changes in facial animation parameters expressed by the user while interacting with first content at 706. In accordance with at least one embodiment, the service may use the changes and/or movement of particular facial regions of a user as identified in images that are captured at an increased frame rate (i.e., 30 to 60 frames per second).

The process 700 may include updating a mapping of the emotional response determined for the user interacting with the first content at 708. In embodiments, the service provider computer may maintain a mapping of emotional responses by a plurality of users to interacting with first content by utilizing the captured facial images. The process 700 may conclude at 710 by identifying an aggregated emotional response for the first content utilizing a plurality of emotional responses determined for a plurality of users including the user. In accordance with at least one embodiment, the impact or emotional response from an aggregated group of people can be associated with content, or a set of content, to determine the effect of the content. For example, an impact of an advertisement campaign may be adequately quantified via an emotional response expressed by users interacting with the advertisement campaign. The determined emotional impact or response for the advertisement campaign may be used when selecting content for presentation to subsequent users based on their determined emotional state.

In accordance with at least one embodiment, instructions may be provided by the service provider computers to the user device, or the image capture device associated with the user device, to capture the series of images of the user periodically during a session of activity. For example, the image capture device may periodically capture a series of images of the user during a browsing session of an online marketplace via a web page or native application. In embodiments, multiple sets of series of images may be captured and analyzed to identify how the user's emotional state and/or response has changed throughout the user session of interacting with content. In accordance with at least one embodiments, the emotional response and/or state of a user may be determined at periodic times during the user session. In some embodiments, the service provider computer may generate a temporary default or neutral face for the user utilizing the series of images. Changes in action units or facial animation parameters can be measured from the temporary default or neutral face of the user to determine an emotional response or state expressed by the user. In accordance with at least one embodiment, if a user opts out of the emotion detection and recommendation service feature, the service may attempt to determine an emotional state of the user based on aggregating the user with other users utilizing similar demographic information (i.e., geographic location, gender, etc.) or other information such as shopping history, communication channels utilized, or devices being utilized.

The process 800 may include receiving, from a user device, one or more facial images of a user in response to an indication of interaction with first content by the user at 802. The process 800 may include identifying a change in facial animation parameters expressed by the user while interacting with the first content based on the one or more facial images and a facial action coding system at 804. In embodiments, a user may interact with content by viewing content, listening to content, or clicking or otherwise interacting with the content, as well as the absence of a reaction can be an interaction. The process 800 can include determining an emotional profile for the user based on the identified change in the facial animation parameters and the first content at 806. The emotional profile for a user may indicate responses from the user mapped to certain content, communication channels of content, and actions taken in response to interacting with the content. The process 800 may conclude at 808 by transmitting second content to the user device utilizing a particular communication channel determined based on the emotional profile for the user. For example, users may respond positively or happy when interacting with content communicated via email, when happy. However, the user may respond annoyed or irritated when content is presented via short message service (SMS) text when they are already in an angry mood.

As described herein, instructions may be generated by the service provider computer and transmitted to the user device to capture particular portions of a user's face to identify a first position of the user's eyes, eyebrows, nose, cheekbones, chin, or lips. In some embodiments, a user's emotional state or response may be mapped to a first category of emotions and subsequently refined to a second or subset category of emotions. For example, the user's emotional response may be first deemed to be happy and later refined to ecstatic. In accordance with at least one embodiment, the interaction or lack of interaction by the user with the second content via the particular communication channel determined by the service provider can be a useful data point in whether the correct communication channel is selected for their given emotional state. In embodiments, a user's emotional profile may be determined based on identifying one or more changes in facial animation parameters expressed by the user over or for a first period of time. For example, the user's emotional profile may not accurately reflect the emotional profile or state of a user by merely determining their emotional response to one piece of content but will be fleshed out and more accurately represent the user as the service provider computers determine and map their emotional response to a set or series of content over a period of time. In some embodiments, a communication channel for presenting subsequent content once an emotional response or state has been determined for a user may be selected based on a particular communication channel utilized by users with a similar emotional response or state.

FIG. 9 illustrates an example architecture for implementing an emotion detection and recommendation service feature, in accordance with at least one embodiment. In architecture 900, one or more users 902 (e.g., customers, users, etc.) may utilize user computing devices 904(1)-(N) (collectively, user devices 904) to access a browser application 906 or a user interface (UI) accessible through the browser application 906, via one or more networks 908 to provide information such as an interaction with content, transmit facial images of the user, or geo-location information for the user device 904, or other information for determining an emotional response/state of the user as described herein. The "browser application" 906 can be any browser control or native application of user device 904 that can access and display a network page or other information such as a UI for a native software application for enabling the presentation of content and capturing of facial images and/or data of the user, via the user device 904. A native software application may include an application or program that has been developed for use on a particular platform (such as an operating system) or a particular device (such as a particular type of mobile device or user device 904). In embodiments, the user device 904 may include one or more components (e.g., image capture component, camera, video recorder, video stream capture device, etc.) for capturing facial images and/or user data of the user 902 as they interact with content via the user device 904.

The user devices 904 may include at least one memory 910 and one or more processing units or processor(s) 912. The memory 910 may store program instructions that are loadable and executable on the processor(s) 912, as well as data generated during the execution of these programs. Depending on the configuration and type of the user devices 904, the memory 910 may be volatile (such as random access memory (RAM)) and/or non-volatile (such as read-only memory (ROM), flash memory, etc.). The user devices 904 may also include additional removable storage and/or non-removable storage including, but not limited to, magnetic storage, optical disks, and/or tape storage. The disk drives and their associated non-transitory computer-readable media may provide non-volatile storage of computer-readable instructions, data structures, program modules, and other data for the user devices 904. In some implementations, the memory 910 may include multiple different types of memory, such as static random access memory (SRAM), dynamic random access memory (DRAM), or ROM.

Turning to the contents of the memory 910 in more detail, the memory 910 may include an operating system and one or more application programs or services for implementing the features disclosed herein. Additionally, the memory 910 may include one or more modules for implementing the features described herein including the emotion detection service module 930.

The architecture 900 may also include one or more service provider computers 914 that may, in some examples, provide computing resources such as, but not limited to, client entities, low latency data storage, durable data storage, data access, management, virtualization, hosted computing environment or "cloud-based" solutions, electronic content performance management, etc. The one or more service provider computers 914 may implement or be an example of the service provider computer(s) 110 and 408 of FIGS. 1 and 4. The one or more service provider computers 914 may also be operable to provide site hosting, computer application development, and/or implementation platforms, combinations of the foregoing, or the like to the one or more users 902.

In some examples, the networks 908 may include any one or a combination of many different types of networks, such as cable networks, the Internet, wireless networks, cellular networks and other private and/or public networks. While the illustrated example represents the users 902 communicating with the service provider computers 914 over the networks 908, the described techniques may equally apply in instances where the users 902 interact with the one or more service provider computers 914 via the one or more user devices 904 over a landline phone, via a kiosk, or in any other manner. It is also noted that the described techniques may apply in other client/server arrangements (e.g., set-top boxes, etc.), as well as in non-client/server arrangements (e.g., locally stored applications, peer-to-peer arrangements, etc.).

The one or more service provider computers 914 may be any type of computing device such as, but not limited to, a mobile phone, a smart phone, a personal digital assistant (PDA), a laptop computer, a desktop computer, a server computer, a thin-client device, a tablet PC, etc. Additionally, it should be noted that in some embodiments, the one or more service provider computers 914 may be executed by one or more virtual machines implemented in a hosted computing environment. The hosted computing environment may include one or more rapidly provisioned and released computing resources, which computing resources may include computing, networking, and/or storage devices. A hosted computing environment may also be referred to as a cloud computing environment or distributed computing environment. In some examples, the one or more service provider computers 914 may be in communication with the user device 904 via the networks 908, or via other network connections. The one or more service provider computers 914 may include one or more servers, perhaps arranged in a cluster or as individual servers not associated with one another.

In one illustrative configuration, the one or more service provider computers 914 may include at least one memory 916 and one or more processing units or processors(s) 918. The processor(s) 918 may be implemented as appropriate in hardware, computer-executable instructions, firmware, or combinations thereof. Computer-executable instruction or firmware implementations of the processor(s) 918 may include computer-executable or machine-executable instructions written in any suitable programming language to perform the various functions described when executed by a hardware computing device, such as a processor.

The memory 916 may store program instructions that are loadable and executable on the processor(s) 918, as well as data generated during the execution of these programs. Depending on the configuration and type of the one or more service provider computers 914, the memory 916 may be volatile (such as RAM) and/or non-volatile (such as ROM, flash memory, etc.). The one or more service provider computers 914 or servers may also include additional storage 920, which may include removable storage and/or non-removable storage. The additional storage 920 may include, but is not limited to, magnetic storage, optical disks and/or tape storage. The disk drives and their associated computer-readable media may provide non-volatile storage of computer-readable instructions, data structures, program modules, and other data for the computing devices. In some implementations, the memory 916 may include multiple different types of memory, such as SRAM, DRAM, or ROM.

The memory 916, the additional storage 920, both removable and non-removable, are all examples of non-transitory computer-readable storage media. For example, computer-readable storage media may include volatile or non-volatile, removable or non-removable media implemented in any method or technology for storage of information such as computer-readable instructions, data structures, program modules, or other data. The memory 916 and the additional storage 920 are all examples of non-transitory computer storage media. Additional types of non-transitory computer storage media that may be present in the one or more service provider computers 914 may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by the one or more service provider computers 914. Combinations of any of the above should also be included within the scope of non-transitory computer-readable media.

The one or more service provider computers 914 may also contain communication connection interface(s) 922 that allow the one or more service provider computers 914 to communicate with a data store, another computing device or server, user terminals and/or other devices on the networks 908. The one or more service provider computers 914 may also include I/O device(s) 924, such as a keyboard, a mouse, a pen, a voice input device, a touch input device, a display, speakers, a printer, etc.

Turning to the contents of the memory 916 in more detail, the memory 916 may include an operating system 926, one or more data stores 928, and/or one or more application programs or services for implementing the features disclosed herein including the emotion detection service module 930. In accordance with at least one embodiment, the emotion detection service module 930 may be configured to at least transmit content to user device(s) 904 and receive, in response to the user 902 interacting with said content, one or more images or facial images of the user 902 in response to interacting with the content. The images may be analyzed and movement and/or changes in facial animation parameters or action units may be utilized, along with a facial action coding system, to determine an emotional response and/or state of the user. In response to determining the emotional response particular content may be selected, content may be edited, or a workflow of content/actions may be transmitted to the user device. In accordance with at least one embodiment, the emotion detection service module 930 may aggregate or cluster a user's emotional profile with other users emotional profile. The aggregated or clustered group of user's emotional profiles can be utilized to identify appropriate recommendations or edit content appropriately for people with similar emotional profiles.

Figure 10:
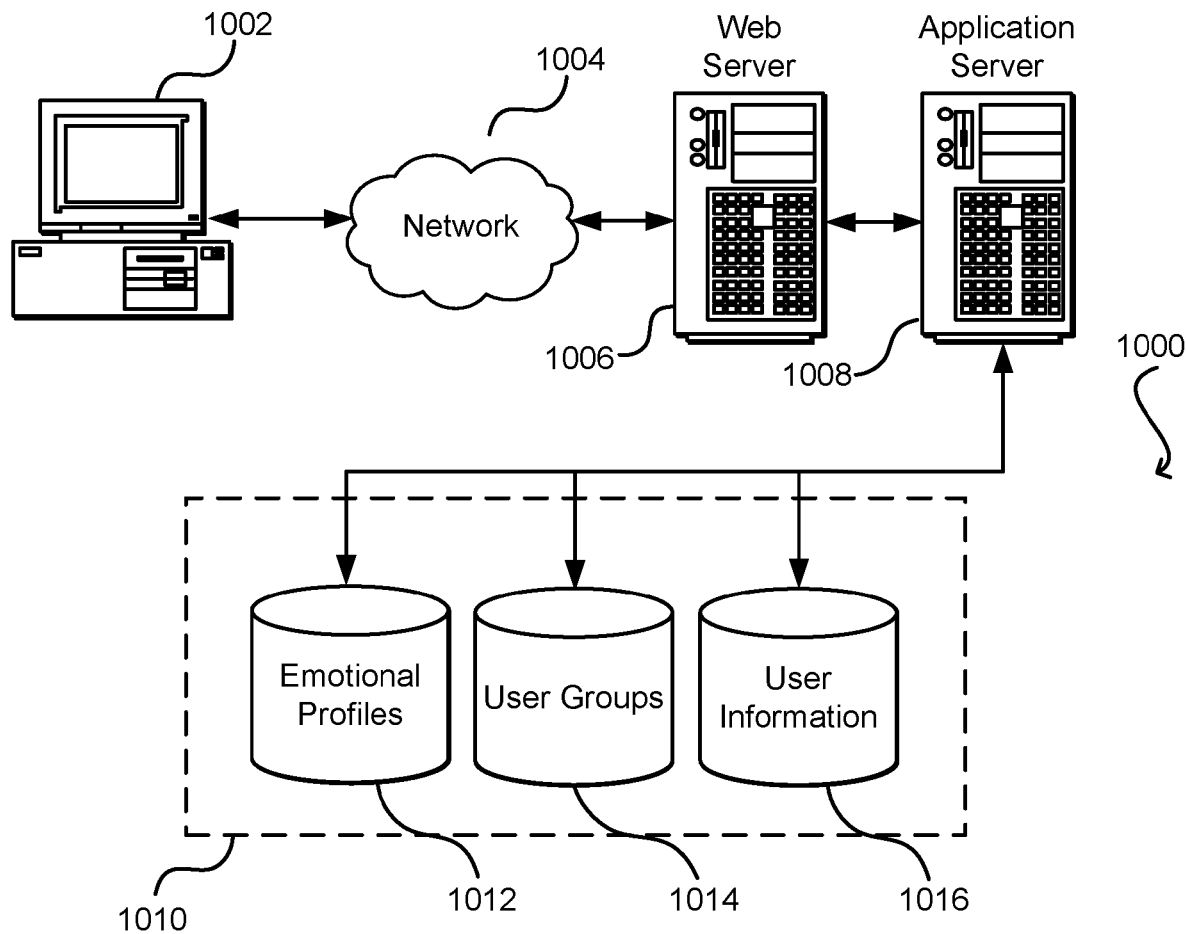
FIG. 10 illustrates an environment in which various embodiments can be implemented.

FIG. 10 illustrates aspects of an example environment 1000 for implementing aspects in accordance with various embodiments. As will be appreciated, although a Web-based environment is used for purposes of explanation, different environments may be used, as appropriate, to implement various embodiments. The environment includes an electronic client device 1002, which can include any appropriate device operable to send and receive requests, messages, or information over an appropriate network 1004 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1006 for receiving requests and serving content in response thereto, although for other networks an alternative device serving a similar purpose could be used as would be apparent to one of ordinary skill in the art.

The illustrative environment includes at least one application server 1008 and a data store 1010. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 1002 and the application server 1008, can be handled by the Web server. It should be understood that the Web and application servers are not required and are merely example components, as structured code discussed herein can be executed on any appropriate device or host machine as discussed elsewhere herein.

The data store 1010 can include several separate data tables, databases or other data storage mechanisms and media for storing data relating to a particular aspect. For example, the data store illustrated includes mechanisms for storing emotional profiles 1012 and user information 1016, which can be used to serve content for the production side, and generate recommendations. The data store also is shown to include a mechanism for storing user groups 1014, which can be used for recommending content and/or generating workflows of content or actions to present to a user based on emotional response from similar users. It should be understood that there can be many other aspects that may need to be stored in the data store, such as for page image information and to access right information, which can be stored in any of the above listed mechanisms as appropriate or in additional mechanisms in the data store 1010. The data store 1010 is operable, through logic associated therewith, to receive instructions from the application server 1008 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 1002. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
   receiving, by a computer system and from a user device, a series of facial images of a user associated with the user device in response to the user interacting with a first set of content;
   identifying, by the computer system, an emotional state of the user based at least in part on a change in facial animation parameters included in the series of facial images in response to the user interacting with the first set of content and a facial action coding system (FACS), the change in the facial animation parameters determined based at least in part on one or more of a first-order and second-order derivative of grayscale algorithm, a feature constellation analysis algorithm, or a Haar wavelet detection algorithm;
   clustering, by the computer system, an emotional profile for the user into a group with other emotional profiles associated with a plurality of users based at least in part on the identified emotional state of the user and respective emotional states of the plurality of users, and information associated with the user and the plurality of the users, the information identifying a shopping history of the user and the plurality of users, communication channels utilized by the user and the plurality of users, and devices utilized by the user and the plurality of users, the emotional profile derived from the emotional state of the user;
   determining, by the computer system, a second set of content to present to the user based at least in part on the group;
   editing, by the computer system, the second set of content by adding or removing text, images, or interactive features included in the second set of content, the editing based at least in part on the emotional state of the user; and
   transmitting, by the computer system and to the user device, the edited second set of content for presentation to the user.

2. The computer-implemented method of claim 1, wherein editing the second set of content includes filtering a particular set of content in a medium of content based at least in part on the emotional state of the user.

3. The computer-implemented method of claim 1, wherein clustering the emotional profile for the user into the group with other emotional profiles is further based at least in part on demographic information associated with the user and the plurality of users.

4. The computer-implemented method of claim 1, further comprising receiving, by the computer system, a video capture or video stream of the user in response to the user interacting with the first set of content.

5. The computer-implemented method of claim 4, wherein identifying, by the computer system, the emotional state of the user is further based at least in part on the change in the facial animation parameters extracted from the received video capture or video stream and the FACS.

6. The computer-implemented method of claim 1, wherein identifying, by the computer system, the emotional state of the user occurs upon receiving the series of facial images, the series of facial images being destroyed upon identifying the emotional state of the user.

7. A non-transitory computer-readable storage medium having stored thereon instructions that, when executed by a computer system, cause the computer system to at least:
   receiving, from a user device, a series of facial images of a user associated with the user device in response to the user interacting with a first set of content;
   identifying an emotional state of the user based at least in part on a change in facial animation parameters included in the series of facial images in response to the user interacting with the first set of content and a facial action coding system (FACS), the change in the facial animation parameters determined based at least in part on one or more of a first-order and second-order derivative of grayscale algorithm, a feature constellation analysis algorithm, or a Haar wavelet detection algorithm;
   clustering an emotional profile for the user into a group with other emotional profiles associated with a plurality of users based at least in part on the identified emotional state of the user and respective emotional states of the plurality of users, and information associated with the user and the plurality of users, the information identifying a shopping history of the user and the plurality of users, communication channels utilized by the user and the plurality of users, and devices utilized by the user and the plurality of users, the emotional profiled derived from the emotional state of the user;
   determining a second set of content to present to the user based at least in part on the group;
   editing the second set of content by adding or removing text, images, or interactive features included in the second set of content, the editing based at least in part on the emotional state of the user; and
   transmitting, to the user device, the edited second set of content for presentation to the user.

8. The non-transitory computer-readable storage medium of claim 7, wherein editing the second set of content includes filtering a particular set of content in a medium of content based at least in part on the emotional state of the user.

9. The non-transitory computer-readable storage medium of claim 7, wherein clustering the emotional profile for the user into the group with other emotional profiles is further based at least in part on demographic information associated with the user and the plurality of users.

10. The non-transitory computer-readable storage medium of claim 7, further comprising the instructions that are executable by the computer system to receiving a video capture or video stream of the user in response to the user interacting with the first set of content.

11. The non-transitory computer-readable storage medium of claim 10, wherein identifying the emotional state of the user is further based at least in part on the change in the facial animation parameters extracted from the received video capture or video stream and the FACS.

12. The non-transitory computer-readable storage medium of claim 7, wherein identifying the emotional state of the user occurs upon receiving the series of facial images, the series of facial images being destroyed upon identifying the emotional state of the user.

13. A computer system, comprising:
   memory that stores computer-executable instructions; and
   at least one processor configured to access the memory and execute the computer-executable instructions to collectively at least:
      receive, from a user device, a series of facial images of a user associated with the user device in response to the user interacting with a first set of content;
      identify an emotional state of the user based at least in part on a change in facial animation parameters included in the series of facial images in response to the user interacting with the first set of content and a facial action coding system (FACS), the change in the facial animation parameters determined based at least in part on one or more of a first-order and second-order derivative of grayscale algorithm, a feature constellation analysis algorithm, or a Haar wavelet detection algorithm;

cluster an emotional profile for the user into a group with other emotional profiles associated with a plurality of users based at least in part on the identified emotional state of the user and respective emotional states of the plurality of users, and information associated with the user and the plurality of users, the information identifying a shopping history of the user and the plurality of users, communication channels utilized by the user and the plurality of users, and devices utilized by the user and the plurality of users, the emotional profile derived from the emotional state of the user;

determine a second set of content to present to the user based at least in part on the group;

edit the second set of content by adding or removing text, images, or interactive features included in the second set of content, the editing based at least in part on the emotional state of the user; and transmit, to the user device, the edited second set of content for presentation to the user.

14. The computer system of claim 13, wherein editing the second set of content includes filtering a particular set of content in a medium of content based at least in part on the emotional state of the user.

15. The computer system of claim 13, wherein clustering the emotional profile for the user into the group with other emotional profiles is further based at least in part on demographic information associated with the user and the plurality of users.

16. The computer system of claim 13, wherein the at least one processor is further configured to enable the computer system to receiving a video capture or video stream of the user in response to the user interacting with the first set of content.

17. The computer system of claim 16, wherein identifying the emotional state of the user is further based at least in part on the change in the facial animation parameters extracted from the received video capture or video stream and the FACS.

18. The computer system of claim 13, wherein identifying the emotional state of the user occurs upon receiving the series of facial images, the series of facial images being destroyed upon identifying the emotional state of the user.

* * * * *